No. 811,540. PATENTED FEB. 6, 1906.
J. J. BAYNE.
GUN BEARING.
APPLICATION FILED NOV. 29, 1904.

2 SHEETS—SHEET 1.

Witnesses
R. A. Boswell,
Nellie A. Mayhew.

Inventor
John J. Bayne.
By A. L. Hough,
Attorney

No. 811,540. PATENTED FEB. 6, 1906.
J. J. BAYNE.
GUN BEARING.
APPLICATION FILED NOV. 29, 19
2 SHEETS—SHEET 2.
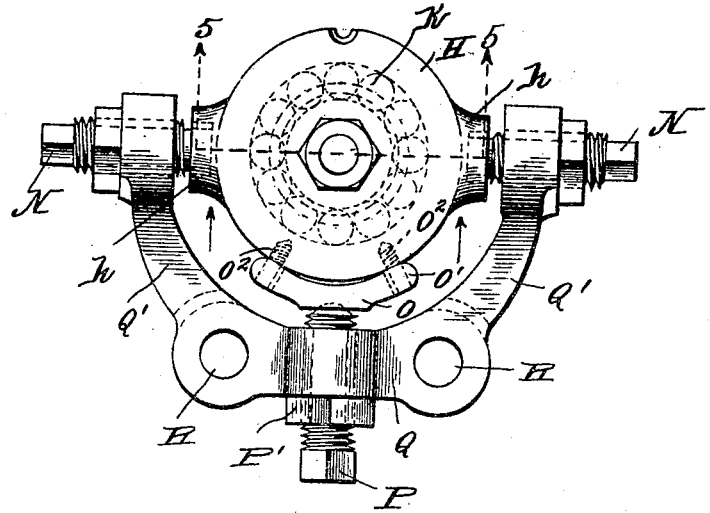
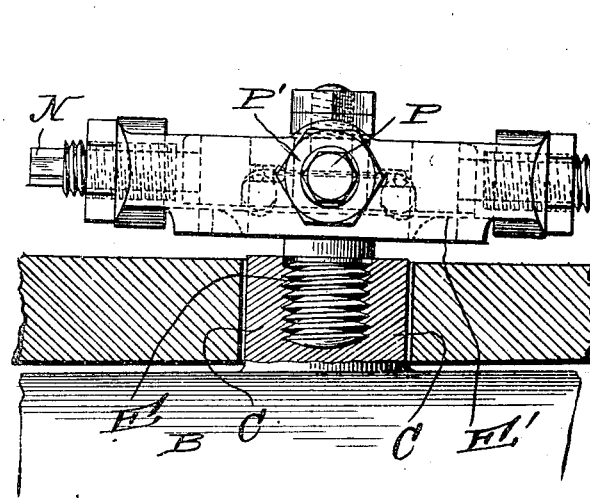
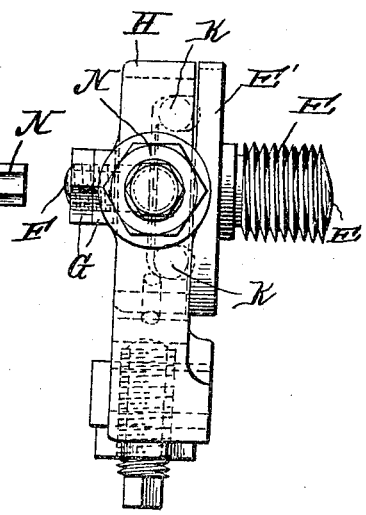
Witnesses
R. A. Boswell
Nellie A. Mayhew
Inventor
John J. Bayne,
A. L. Hough
Attorney

UNITED STATES PATENT OFFICE.

JOHN J. BAYNE, OF ALEXANDRIA, VIRGINIA.

GUN-BEARING.

No. 811,540.  Specification of Letters Patent.  Patented Feb. 6, 1906.

Application filed November 29, 1904. Serial No. 234,735.

*To all whom it may concern:*

Be it known that I, JOHN J. BAYNE, a citizen of the United States, residing at Alexandria, in the county of Alexandria and State of Virginia, have invented certain new and useful Improvements in Gun-Bearings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in gun-mounts; and the object in view is to produce a mount in which the entire weight of the gun will rest upon elastic bearings, allowing the gun to swing freely upon ball-bearings without touching the mount, thereby eliminating all sliding or journal friction which exists in gun-mounts which are commonly in use.

Another object of the invention is to produce a bearing for gun-mounts in which the trunnion is firmly held between the adjustment-screws of the bearing, giving a constant pitch-center for the arc and pinion to roll upon.

The invention consists, further, in the provision of mechanism comprising a system of springs with sufficient tension only to support the weight of the gun and allowing the force of the concussion resulting from the firing of the gun to fall upon the solid bearings of the mount, thereby preventing indentation of the ball-race.

My invention consists, further, in various details of construction and combinations and arrangements of parts, which will be hereinafter fully described and then specifically defined in the appended claims.

I illustrate my invention in the accompanying drawings, in which—

Figure 1:
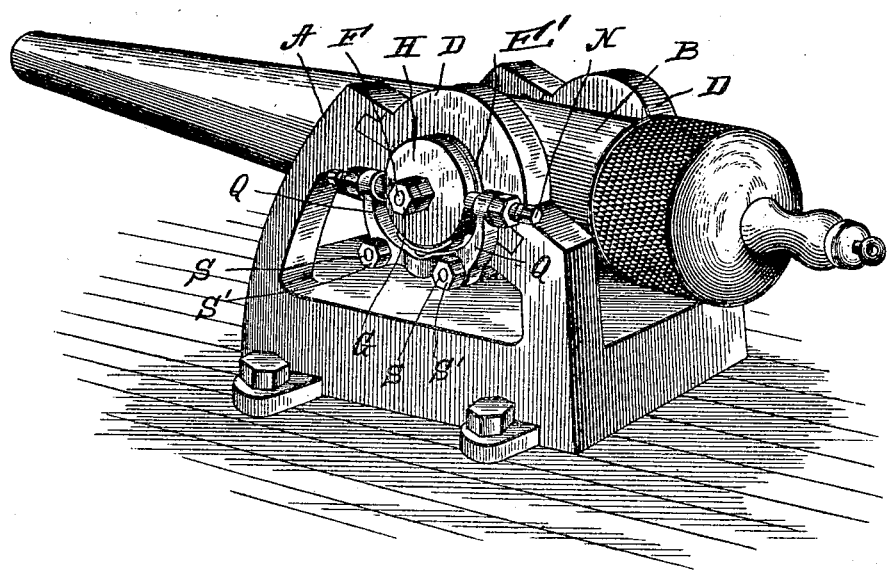
Figure 5:
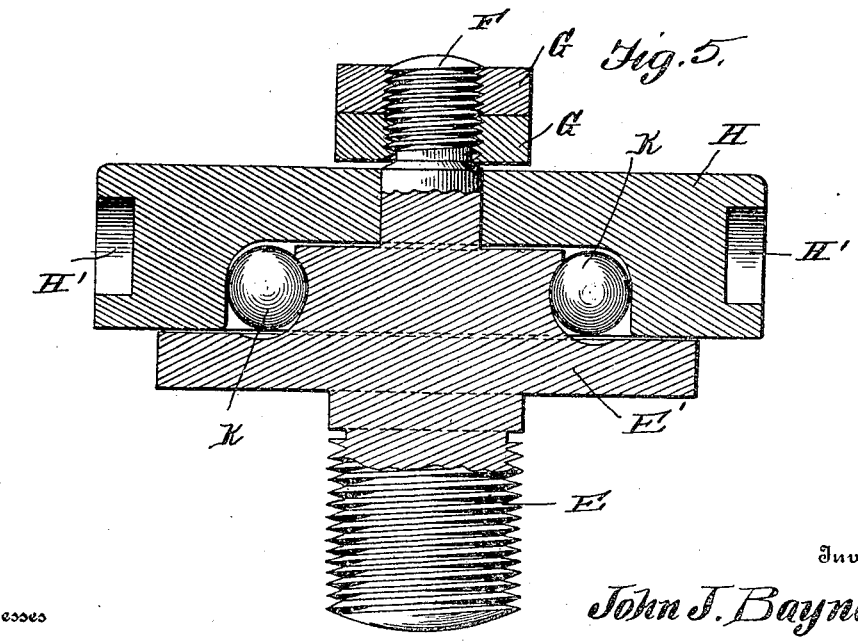

Figure 1 is a perspective view showing my invention as applied to a gun-mount. Fig. 2 is a side elevation of the invention detached from the mount. Fig. 3 is a top plan view of the apparatus fastened to a gun, a portion being shown in section. Fig. 4 is an edge view of the device, and Fig. 5 is a sectional view on line 5 5 of Fig. 2.

Reference now being had to the details of the drawings by letter, A designates a gun-mount of the usual construction, and B is a gun having trunnions C projecting therefrom at positions diametrically opposite each other. D designates the cover or cap to the bearing, all of which are of the usual construction employed in mounts for guns of the character illustrated. Mounted in a threaded hole in each of said trunnions is a screw E, which has integral therewith an inner disk E' with raceway for ball-bearings, (shown clearly in Fig. 5 of the drawings,) and projecting from the outer face of said disk is a contracted threaded bolt extension F, adapted to receive the threaded nuts G.

H designates a circular outlined outer disk having a raceway for the ball-bearings K, and said disk H is centrally apertured to receive the shank portion of the bolt F. At positions diametrically opposite in the circumference of the disk H are recesses H', which are formed in bosses $h$, projecting from the disk, and each recess is designed to receive the inner end of an adjusting-screw N.

Q designates a yoke-shaped bearing having two flexible arms Q', and in each of said flexible arms is formed a threaded aperture to receive the adjusting-screws N, the inner ends of which engage said recesses and assist to support the disk and also the weight of the gun. Said yoke-shaped bearing has apertures R therein, through which bolts S pass, which are securely anchored to the carriage or mount, and nuts S' are fitted upon said screws S, whereby said yoke-shaped bearing may be securely held to the carriage or mount. The bearing Q has a centrally-threaded aperture intermediate the apertures R for the reception of the adjusting-screw P, and a jam-nut is mounted upon said screw P for the purpose of holding the latter in an adjusted position. The upper end of the adjusting-screw P supports a concaved spring with arms O', each of which is apertured near its outer end to receive a screw $O^2$, which screws are fastened to the disk H and serve to hold said spring from turning. The under surface of the spring O has a recess $O^3$ to receive the upper convexed end of the adjusting-screw P, as shown clearly in Fig. 2 of the drawings. Said springs O, one on each side of the mount, are designed to sustain thereby the entire weight of the gun and normally hold the gun from engagement with the solid bearings of the mount or carriage.

From the construction shown it will be observed that the entire weight of a gun when equipped with my improved apparatus will rest entirely upon the ball-bearings and the bearings supported upon the springs O and flexible arms Q', the gun having a pivotal movement axially through the trunnions, which latter are normally held from engagement with the solid bearings of the mount; but under the recoil of the gun at the time of firing the same the flexible arms of the bearings Q and springs O will yield, allowing the force of the recoil to come upon the solid bearings and relieving the normal supports of the gun of excessive strain.

From the foregoing it will be observed that the entire weight of the gun resting upon the elastic bearings allows the gun to move freely upon its bearings without touching the mount, thereby eliminating sliding friction commonly existing in ordinary mounts, and as the ball-bearings of the trunnions are firmly held between the adjusting-screws of the bearing a constant pitch-center is afforded for the arc and pinion of the elevating-gear to roll upon.

While I have shown a particular form of apparatus illustrating the principle of my invention, it will be understood that I may vary the details of construction of the apparatus, if desired, without in any way departing from the spirit of the invention.

Having thus fully described my invention, what I claim as new, and desire to secure by Letters Patent, is—

1. In combination with a gun-mount, a gun with trunnions, auxiliary trunnions secured to the gun, ball-bearings, comprising a raceway surrounding said auxiliary trunnions, and elastic supports for said bearings, as set forth.

2. In combination with a gun-mount, a gun with trunnions, auxiliary trunnions secured to the gun, ball-bearings comprising a raceway surrounding said auxiliary trunnions, a yoke secured to said mount and provided with resilient arms for supporting said bearings, as set forth.

3. In combination with a gun-mount, a gun with trunnions, auxiliary trunnions secured to the gun, ball-bearings comprising a raceway surrounding said auxiliary trunnions, a yoke secured to said mount and provided with resilient arms for supporting said bearings, and an adjustable spring carried by said yoke and engaging said bearings, as set forth.

4. In combination with a gun having trunnions, a mount, auxiliary trunnions secured to the gun-trunnions, ball-bearings secured to the auxiliary trunnions, and elastic supports for said bearings, as set forth.

5. In combination with a gun-mount, a gun with trunnions, auxiliary trunnions secured to the gun, ball-bearings comprising raceways therefor, adapted to support the entire weight of the gun, yokes secured to the mount, and having resilient arms, and screws carried by said arms and engaging one of said raceways at each side of the gun, as set forth.

6. In combination with a gun-mount, a gun with trunnions, auxiliary trunnions secured to the gun, ball-bearings adapted to support the weight of the gun, disks forming raceways for said ball-bearings, yokes secured to the mount, and provided with flexible arms, set-screws carried by said arms and engaging one of said raceways at each side of the gun, and an adjustable spring carried by each of said yokes and engaging one of said raceways, as set forth.

7. In combination with a gun-mount, a gun with trunnions, auxiliary trunnions secured to the gun, ball-bearings comprising raceways surrounding said auxiliary trunnions, yokes secured to the mount and provided with resilient arms, set-screws carried by said arms and each engaging a raceway at each trunnion, a set-screw carried by each yoke intermediate its flexible arms, and a spring at each side of the gun secured to a raceway and supported by the set-screw intermediate said flexible arms, as set forth.

8. In combination with a gun and carriage therefor, trunnions upon said gun, a pair of bearing-disks at each trunnion, one of each pair being secured to its adjacent trunnion, balls between said bearing-disks, yokes secured to said carriage and provided with flexible arms, and set-screws carried by said arms and engaging a bearing-disk at each trunnion, as set forth.

9. In combination with a gun and carriage therefor, trunnions upon said gun, a pair of bearing-disks at each trunnion, one of each pair having a threaded shank portion engaging a threaded aperture in its adjacent trunnion, ball-bearings intermediate said bearing-disks, yokes having flexible arms, set-screws carried by said arms and engaging one of each pair of said bearing-disks at positions diametrically opposite, as set forth.

10. In combination with a gun and carriage therefor, trunnions upon said gun, a pair of bearing-disks at each trunnion, one of each pair having a threaded shank portion engaging a threaded aperture in its adjacent trunnion, ball-bearings intermediate said bearing-disks, yokes having flexible arms, set-screws carried by said arms and engaging one of each pair of said bearing-disks at positions diametrically opposite, a spring held yieldingly against one of each pair of said disks, and a set-screw supporting each spring, as set forth.

In testimony whereof I hereunto affix my signature in presence of two witnesses.

JOHN J. BAYNE.

Witnesses:
A. L. HOUGH,
CLARA S. DAVENPORT.